(12) United States Patent
Frigo et al.

(10) Patent No.: US 6,856,711 B1
(45) Date of Patent: Feb. 15, 2005

(54) TECHNIQUE FOR MITIGATION OF POLARIZATION MODE DISPERSION IN FIBER OPTIC TRANSMISSION LINKS

(75) Inventors: Nicholas J. Frigo, Little Silver, NJ (US); Peter D Magill, Freehold, NJ (US)

(73) Assignee: AT&T Corp., New York, NY (US)

( * ) Notice: Subject to any disclaimer, the term of this patent is extended or adjusted under 35 U.S.C. 154(b) by 106 days.

(21) Appl. No.: 10/410,483

(22) Filed: Apr. 9, 2003

(51) Int. Cl.[7] .................................................. G02B 6/00
(52) U.S. Cl. ..................................... 385/11; 359/483
(58) Field of Search ............................... 385/11, 14, 24

(56) References Cited

U.S. PATENT DOCUMENTS 6,744,991 B1 * 6/2004 Cao ........................... 398/147
6,765,723 B1 * 7/2004 Savory ....................... 359/499
6,775,426 B2 * 8/2004 Ito et al. ..................... 385/11

* cited by examiner

*Primary Examiner*—Akm Enayet Ullah
*Assistant Examiner*—Jennifer Doan

(57) ABSTRACT

A technique for PMD mitigation in an optical communications system that utilizes a plurality of polarization rotators in an optical fiber to continuously rotate the polarization state of at least one optical signal that propagates through the fiber. The optical fiber is segregated into a plurality of sections and the polarization rotators are disposed between adjacent sections of the fiber. The polarization state of at least one optical signal received from the first of a pair of adjacent sections is continuously rotated by the polarization rotator prior to being transmitted to the second of the pair of adjacent sections. The rotated optical signals are collected at a receiver and corrected for errors using, for example, forward error correction.

13 Claims, 6 Drawing Sheets

TECHNIQUE FOR MITIGATION OF POLARIZATION MODE DISPERSION IN FIBER OPTIC TRANSMISSION LINKS

FIELD OF THE INVENTION

The present invention relates generally to optical communications, and more particularly, to a system and method for mitigating the effects of Polarization Mode Dispersion (PMD) in optical transmission media.

BACKGROUND

Optical communications have revolutionized the telecommunications industry in recent years. The fiber optic medium provides the ability to efficiently transmit high bit rate signals through a low-loss medium. The development of modern high bandwidth techniques, and wavelength division multiplexing (WDM) to permit the simultaneous transmission of multiple high bandwidth channels on respective wavelengths, has enabled a tremendous increase in communications capacity. The last decade has been seen efforts to increase capacity by taking advantage of the fiber optic medium to the maximum extent possible.

Signals transmitted through an optical medium can be affected by PMD, which is a form of signal distortion that can be caused by subtle physical imperfections in the optical fiber. In principle, an optical fiber with a circular core has rotational symmetry, so that there is no preferred direction for the polarization of the light carrying the optical signal. However, during fabrication, jacketing, cabling, and installation, perturbations in the fiber that will distort this symmetry can occur, thereby causing the fiber to "look different" to various optical polarizations. One of the manifestations of this loss of symmetry is "birefringence," or a difference in the index of refraction for light that depends on the light's polarization. Light signals with different polarization states will travel at different velocities. In particular, there will be two states of polarization (SOPs), referred to as the "eigenstates" of polarization corresponding to the asymmetric fiber. These eigenstates form a basis set in a vector space that spans the possible SOPs, and light in these eigenstates travels at different velocities.

A birefringent optical fiber transporting a modulated optical signal can temporally disperse the resulting optical frequencies of the signal. For example, an optical pulse, with a given optical polarization, can be formed to represent a "1" in a digital transmission system. If the signal is communicated through a medium with uniform birefringence (i.e., remaining constant along the length of the fiber), the SOPs can be de-composed into corresponding eigenstates, thereby forming two independent pulses, each traveling at its own particular velocity. The two pulses, each a replica of the original pulse, will thus arrive at different times at the end of the birefringent fiber. This can lead to distortions in the received signal at the end terminal of the system. In this simple illustrative case, the temporal displacement of the two replicas, traveling in the "fast" and "slow" SOPs, grows linearly with distance.

In a typical optical communications system, birefringence is not constant but varies randomly over the length of the transmission medium. Thus, the birefringence, and therefore, the eigenstate, changes with position as the light propagates through the length of the fiber. In addition to intrinsic changes in birefringence resulting from imperfections in the fabrication processes, environmental effects such as, for example, temperature, pressure, vibration, bending, etc., can also affect PMD. These effects can likewise vary along the length of the fiber and can cause additional changes to the birefringence. Thus, light that is in the "fast" SOP in one section of fiber might become be in the "slow" SOP at another section of the fiber. Instead of increasing linearly with distance, the temporal separations in the pulse replicas eventually take on the characteristics of a random walk, and grow with the square root of the distance. Despite the local variations in the fast and slow states, it is understood that when the fiber as a whole is considered, another set of states can be defined that characterize the PMD for the entire fiber and split the propagation of the signal into fast and slow components. These "principal states" can be imaged (in a mathematical sense) back to the input face, and used as an alternative basis set. Thus, an arbitrary launch SOP will have components in each of the principal states, and distortion will result from the replication of the pulses after resolution into principal states and their differential arrival times. While the physical process is described in the foregoing in a "global" as opposed to "local" sense, the basic impairment is the same; distortion results from the time delay introduced in the pulse replicas.

The above discussion relates to "narrowband" signals, i.e., having a narrow enough bandwidth that the optical properties of the fiber can be characterized as operating at a single wavelength. This is commonly referred to as "first order PMD." Birefringence, however, can also vary with wavelength, such that each section of fiber may have slightly different characteristics, both in the magnitude and direction of the birefringence. As a consequence, after a long propagation through an optical medium, light from two neighboring wavelengths initially having the same polarization may experience what looks like a fiber with two different characteristics.

Theoretically, PMD can be represented by a Poincare sphere, or "Stokes' space" representation. In this representation, the equations of motion for SOPs and PMD at a given optical frequency are given by:

$$\partial s/\partial z = \beta \times s \quad (1a)$$

$$\partial s/\partial \omega = \tau \times s \quad (1b)$$

$$\partial \tau/\partial z = \partial \beta/\partial \omega + \beta \times \tau \quad (1c)$$

In these equations (which are in the "representation" space, not "real" space) "$\beta$" represents the birefringence of the fiber at position z, "s" represents the SOP of the light at position z, and "$\tau$" represents the PMD. Generally, Eqn. (1a) states that birefringence causes the representation of the SOP to rotate about the "$\beta$" axis as light propagates through the fiber. Eqn. (1b) states that, when viewed at a given position (e.g., the fiber output), the system's PMD causes the SOP to rotate about it as a function of optical frequency. In this regard, light launched at a given optical frequency will evolve to an SOP at the output, and if the optical frequency is then changed (but the launch polarization remains the same), the SOP at the output will also begin to rotate about the PMD vector, $\tau$. Eqn (1c) states that the vector characterizing PMD changes along the length of the fiber. The driving term in Eqn (1c), $\beta' = \partial \beta/\partial \omega$, which we refer to as the "specific PMD," describes the relationship of birefringence to optical frequency. Even for the simplest cases, there is usually a non-zero driving term (and thus PMD) for birefringent fibers. Based on the above, the vector s will suffer infinitesimal rotations about the axis defined by $\beta$, and that the rotation axis will change as $\beta$ changes with distance (and parametrically with time). However, the total evolution of s can be represented by a single, finite rotation based upon Euler's theorem. If the signal bandwidth is large enough to experience these variations, it is commonly referred to as "higher order" PMD. Higher order PMD also leads to pulse distortion as the optical bandwidth of the signal increases. As the bandwidth increases, the input signal can be decomposed into Fourier components, with each propagated in accordance with the equations discussed above, and the components collected at the output.

In the narrowband context, for illustrative purposes, the "concatenation rule" represented by the above equations states that the PMD of a given section of fiber can be "imaged" to the PMD at the output through the same transformation that governs birefringence. For a fiber consisting of two sections having respective PMDs $\tau_1$ and $\tau_2$, and respective rotations of the SOP via finite rotations $R_1$ and $R_2$, the total PMD can be represented by:

$$\tau = \tau_2 + R_2 \tau_1 \qquad (2)$$

This equation states that the final PMD vector is represented by the vectorial sum of the second (i.e. final) section's PMD vector and the first section's PMD vector, but only after that first PMD vector has been rotated by the same rotation operator ($R_2$) that rotates the SOPs propagating at that wavelength. This is shown by noting the rotations by $\beta$ implied in Eqns. 1a and 1c.

A generalization of Eqn. 2 shows that a similar rule applies for a fiber having multiple sections. Thus, each section of length $\Delta z$ can be considered as having it's own uniform primitive PMD vector, $\beta' \Delta z$. The PMD of the entire multi-sectioned fiber can be characterized as a vector sum of the transformed primitive PMDs, one for each section, where each PMD primitive vector is transformed by the concatenated rotation of all the sections between it and the output. Since each of these constituent vectors is only a transformed version of its corresponding primitive PMD vector, each has the same length as its primitive vector, but effectively suffers a random rotation (the Euler's theorem equivalent of the concatenated rotations between the section and the output). This process is illustrated in FIG. 1, where for an arbitrary optical frequency $\omega_0$, the fiber (hereinafter, the optical fiber will be referred to as optical fiber) 100 is segregated into five independent sections (i.e., A, B, C, D, E), where each section's PMD is represented by a vector (row 102) directly below that section, and these PMD vectors represent a random distribution in magnitude and direction for the respective sections of the optical fiber. Each section's PMD vector (except the last one's) is imaged to the end and is shown on the right side of the figure (at 106) as a primed version of the original. Thus, the PMD vector for section B is propagated through sections C, D, and E, resulting in its output image, vector B'. The PMD for the entire fiber is then computed as the vector sum of these constituents as depicted at 108 in FIG. 1.

Referring now to FIG. 2, the PMD of the same fiber is shown at a slightly different optical frequency, $\omega_0 + \Delta\omega$. In this example, in row 202 the PMD for each section at $\omega_0$ (from FIG. 1) is represented by dotted vectors, while the PMD for each section at $\omega_0 + \Delta\omega$ is represented by solid vectors. Each primitive vector corresponding to this neighboring frequency ($\omega_0 + \Delta\omega$) is slightly different than the primitive vector for the original frequency $\omega_0$. This, by itself, results in a slightly different sum for the total PMD vector at $\omega_0 + \Delta\omega$. However, in addition to slight changes in the primitive vectors, the new optical frequency also causes different rotations in each section, since the birefringence in each section can also be a function of optical frequency. The images for each section are imaged (trajectories 204) to the output at 206, and are slightly different from those depicted in FIG. 1 as shown by the difference at 206 between the solid and dotted arrows. These change more dramatically as the optical frequency changes. In FIG. 2, the total PMD vector 208 at this new optical frequency is shown as a solid arrow, while the PMD vector at $\omega_0$ (from FIG. 1) is depicted as a dotted arrow. Thus, the PMD will change in magnitude and direction as a function of the optical frequency, even though the constituent PMD vectors for the sections may be drawn from the same statistical ensemble representing the fiber's properties. In large part, the study of PMD is a study of the properties of the statistics of the vector sum of these images.

Both the magnitude of the PMD vector, called the "differential group delay" or DGD, and the directions of the unit vectors parallel and anti-parallel to the PMD vector, called the "Principal States of Polarization" (PSPs), change with optical frequency. The principal states are orthogonal and thus are on opposite sides of the sphere. The unit vector is usually associated with the slowest mode. Most frequently, it is the DGD which is plotted in discussions of PMD, but variations in the PSPs with optical frequency also can cause distortion in the optical link. The properties of the PMD are therefore going to follow the statistics of the sum of a set of vectors from the sections of the fiber that are chosen from a distribution and then, for the most part, randomly rotated after propagation through the fiber before being summed.

As discussed above, PMD fluctuates with changes in environmental conditions. Even small environmental changes can add perturbations to the birefringence of sections of the fiber and thereby move many of the imaged primitive vectors. This will consequently change the vector sum. It is to be expected that, at least for subtle environmental changes, the major effect is randomization of the individual rotations in each of the sections. However, since the original distribution was already random, the statistical properties of the perturbed fiber are expected to be essentially the same as those of the original fiber.

Based on the above, a "statistical ensemble" of the PMD can be studied. There are three common statistical ensembles from which observations can be made of this random process: (1) an ensemble of identical, in the statistical sense, fibers in which each primitive section of the fiber is drawn from a sample set, (2) the PMD of a specified fiber transmitting light at a particular wavelength over a very long period of time (this implies the existence of environmental perturbations that will cause each section's primitive vector to change significantly over time and thus also sample the distribution), and (3) the PMD of a specific fiber at a given time over wavelength (where it is assumed that the wavelength spread is sufficient to cause each of the primitive vectors to change significantly over that wavelength spread). The "ergodic hypothesis" is that these three statistical ensembles will have the same properties. This can be represented intuitively by a set of imaged primitive vectors in the three cases. A multi-section fiber (representing the fiber of interest) can be constructed by drawing statistical samples from either a distribution that represents the fiber) or, more generally, the distributions appropriate to the section if a length-dependent fiber is analyzed. Referring again to FIG. 1, a statistical ensemble of identical fibers will draw, for each section, an element from the distribution, and that element will be imaged to the end of the fiber. That is, each section's representative will be imaged to the end and, as each element of the ensemble is examined, that section's contribution will be randomly rotated by the succeeding elements for each ensemble element. Similarly, over a long enough period of time, the image from that section will also be rotated in a random way because environmental perturbations over time will likewise cause the image to be rotated in a random manner. Thus, the average over an ensemble and the average of an ensemble element over time will have the same statistics.

For the case of PMD of a specific fiber at a given time averaged over wavelength, essentially the same distribution of primitive PMD vectors exists. The rotations of the fiber sections vary with frequency because of the linear omega term in $\beta$ (as discussed above, $\beta = \Delta n(\omega) \omega / c$) while the direction and magnitude of the birefringence $\Delta n$ is set by variations in the slow and fast values of the refractive index, $\Delta n = n_s - n_f$. Thus, the distributions at the wavelengths of interest will be substantially the same distributions as from the earlier samples. Although the rotations corresponding to the various sections may change greatly due to phase accumulation from the frequency changes, the net effect is simply another layer of randomization on an already random variable as long as the rotations lead to further randomization. This further randomization occurs if the change in optical frequency is large enough. Thus, the gross features of the statistical nature of PMD can be captured by the statistics of a set of primitive PMD vectors for the fiber sections that are randomly imaged (i.e. rotated) to the end of the fiber and summed.

If, for example, the probability, $P_n$ of a fiber system having unacceptable PMD impairments, for a given channel, is $10^{-5}$ (the "natural" PMD outage probability) then from a statistical ensemble of such fiber systems, $10^{-5}$ of them will experience outage at any given instant. In a statistical sense, this might mean that an outage of 5 minutes [i.e., $1^{-5}*(1\text{ year})$] can occur per year. Given an ensemble of systems that run for infinite duration, one would expect this to be true when calculating the expectation value for the outage. In real systems, however, it is much more likely that a channel will drift into an outage condition and stay in that condition for some time. Thus, there will be long stretches of time in which the system is operational, perhaps some stretches in which the PMD varies rapidly (due to some perturbation) passing from one operational condition to another through an impaired condition, but there will also be situations in which the system remains impaired for long periods of time. Averaged over very long periods of times, the outage may be 5 minutes per year, but in any given year, it is possible for the system to experience outages of less or much greater duration.

Systems designers may be able to tolerate such impairments, for example, by deploying compensators that correct for the PMD impairments by introducing the opposite PMD. This may lead to additional costs in WDM systems, however, as the following example shows. If, for example, in a WDM system that has 100 wavelengths on a single fiber operating over a link with a natural PMD outage probability of $10^{-5}$, PMD that is excessive enough to cause impairment is also likely to vary over wavelength and time, and thus place all channels in potential jeopardy. Accordingly, if one channel needs to be protected with a compensator, then all of them must compensated, or in time, they will all fail. The system operator must therefore purchase 100 compensators, one for each wavelength, even though the expected probability that even one of the compensators might be used at any given time is roughly 0.001 (i.e., $100 \times 10^{-5}$). The odds are therefore 1000 to one that none of the compensators are needed at any given time, even though all 100 must be deployed because each of them will eventually be needed at some time.

Co-owned Eiselt et al. (Eiselt) U.S. patent application Ser. No. 09/729,954, filed Dec. 1, 2000, the disclosure of which is hereby incorporated herein, proposes a technique for mitigating the effects of PMD that utilizes a plurality of polarization rotators in an optical fiber to rotate the SOP of an optical signal. The Eiselt method is based on the premise that if the system is about to fail, it is statistically in one of the "1000 to 1" cases (i.e., an unlikely "long-shot" condition has occurred). The Eiselt system changes the optical link slightly to effectively "roll the dice again" in an attempt to hit one of the favorable 999 cases. FIG. 3 conceptually depicts an optical medium 300 segregated into a plurality of birefringent sections separated by the subscripted polarization rotators "R" which are under system control. The polarization rotators are weak birefringent elements that can be controlled to change the SOP of the signal in a prescribed manner. The polarization can be rotated as a result of the weak birefringence so that, in effect, another element of the statistical ensemble corresponding to that fiber can be chosen. In FIG. 3, the primitive vectors in row 302 for each of the sections are the same as those in FIG. 1. The polarization rotators rotate each section's primitive vectors to a new direction 304. As discussed above, each of these new primitive vectors is imaged to the end of the fiber as represented in row 306. These images are summed at 308 to represent the total PMD vector for the fiber with the polarization rotators. In this example, the total PMD vector is smaller than the original PMD (108) shown in FIG. 1 (and represented by the dashed line in FIG. 3), but it could have been larger. The rotators provide an extra level of randomization of the image vectors, and thus will lead to a realization of PMD that is another ensemble element of the original statistical ensemble, since each section's contribution is drawn from the same distribution. When a new configuration is needed, the polarization rotators are set to new states, thereby choosing another fiber realization from the ensemble. Thus, the polarization controllers essentially enable the choice of another ensemble member from the ensemble that represents the fiber.

The net effect is that by setting (possibly random) polarization rotations in the fiber in this way, the current transmission line is replaced with another one in the ensemble. If, as in the example above, the natural outage probability is $10^{-5}$ and since there are 100 wavelengths to consider, the odds are overwhelming (e.g. 1000:1) that this new transmission line will not have a serious impairment. In Eiselt, an error signal is generated when, by virtue of monitoring the errors in all 100 channels, one of the channels is determined to be suffering a penalty, presumably due to PMD. This error signal can be generated from SONET bytes that are running parity checks, or from diagnostics in the forward error correction (FEC) circuitry that is used on many modern systems. By monitoring each of the FEC diagnostic channels, the system can determine that one of its channels is nearing (or experiencing) an outage, it then resamples the ensemble space by sending commands to change the settings on the R rotators, hopefully landing on one of the ensemble members for which all the channels are operating.

SUMMARY OF THE INVENTION

In accordance with an aspect of the invention, there is provided a method for mitigating PMD effects in optical transmission systems, which eliminates the need for system feedback and threshold determination.

In accordance with another aspect of the invention, a method for mitigating PMD effects in optical transmission systems is provided. The method generally comprises the steps of: receiving at least one optical signal from a first section of an optical fiber; continually rotating the polarization state of the at least one optical signal to randomly change the polarization state of the at least one optical signal; propagating the at least one rotated optical signal through a second section of the optical fiber; receiving the at least one rotated optical signal; converting the at least one rotated optical signal into an electrical signal; and correcting any bit errors which may have been introduced.

In accordance with another aspect of the invention, an optical communications system that mitigates polarization mode dispersion (PMD) effects is provided. The system generally comprises: an optical fiber including a plurality of sections; an optical compensator disposed between adjacent sections of the optical fiber for continuously rotating the polarization state of at least one optical signal received from a first of a pair of adjacent sections of the optical fiber signals to randomly change the polarization state of the at least one optical signal such that at least one rotated optical signal is communicated to a second of the pair of adjacent sections; an optical receiver for receiving the at least one optical signal; and an error correction device for correcting any bit errors which may have been introduced.

The present invention will now be described in detail with particular reference to the accompanying drawings.

DETAILED DESCRIPTION OF THE PREFERRED EMBODIMENTS

With reference now to the several views of the drawings, there is depicted a system for mitigating PMD in an optical transmission system by continually scanning an ensemble of fibers.

Figure 4:
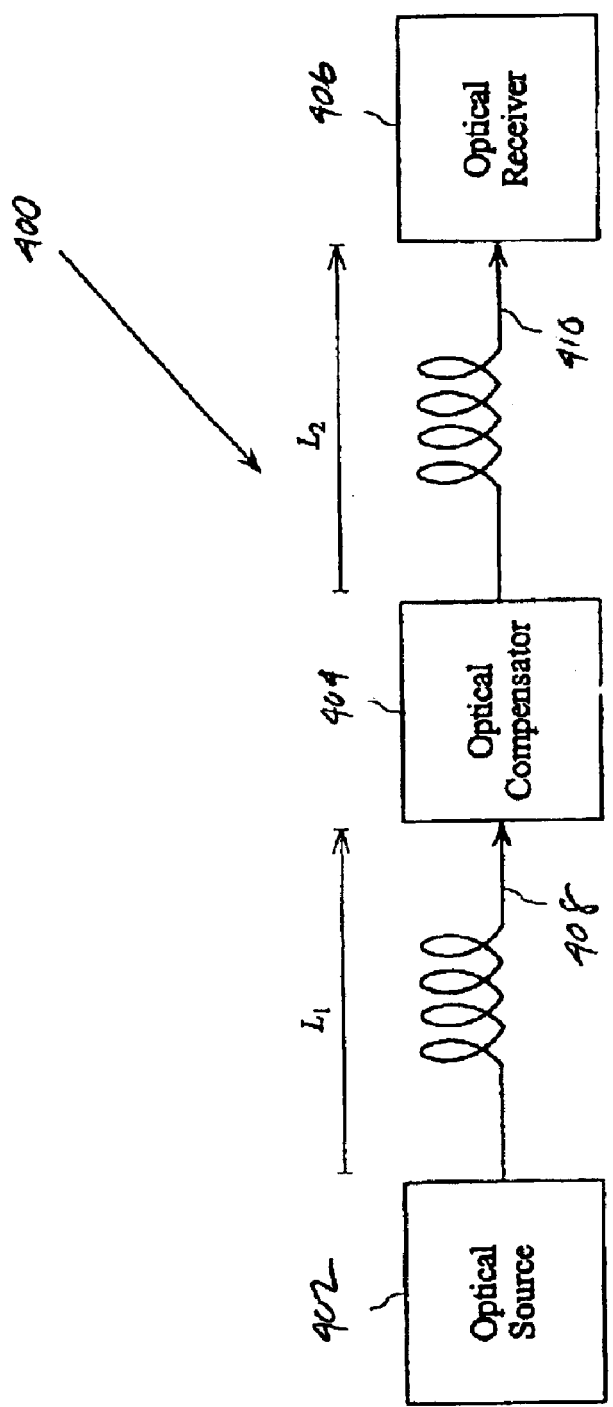
FIG. 4 is a block diagram of an illustrative optical transmission system.

In FIG. 4, there is depicted a block diagram of an illustrative optical transmission system 400, comprising an optical source 402, polarization rotator 404 and an optical receiver 406. The polarization rotator (or polarization scrambler) 404 receives optical signals from the optical source 402 via a first section 408 of an optical fiber, rotates the polarization states of the optical signals, and then provides the rotated optical signals to the optical receiver 406 via a second section 410 of the optical fiber. The polarization rotator randomly rotates the polarization states of the optical signals received via link 408 as described in more detail hereinbelow. The optical source 402 and the optical receiver 406 may be any one of a plurality of different types of optical sources and receiving devices, such as transmission systems with optical transceivers or any known or later developed combination of software and hardware capable of generating and receiving, relaying and/or recalling from storage any information capable of being transmitted and received in an optical signal.

Figure 3:
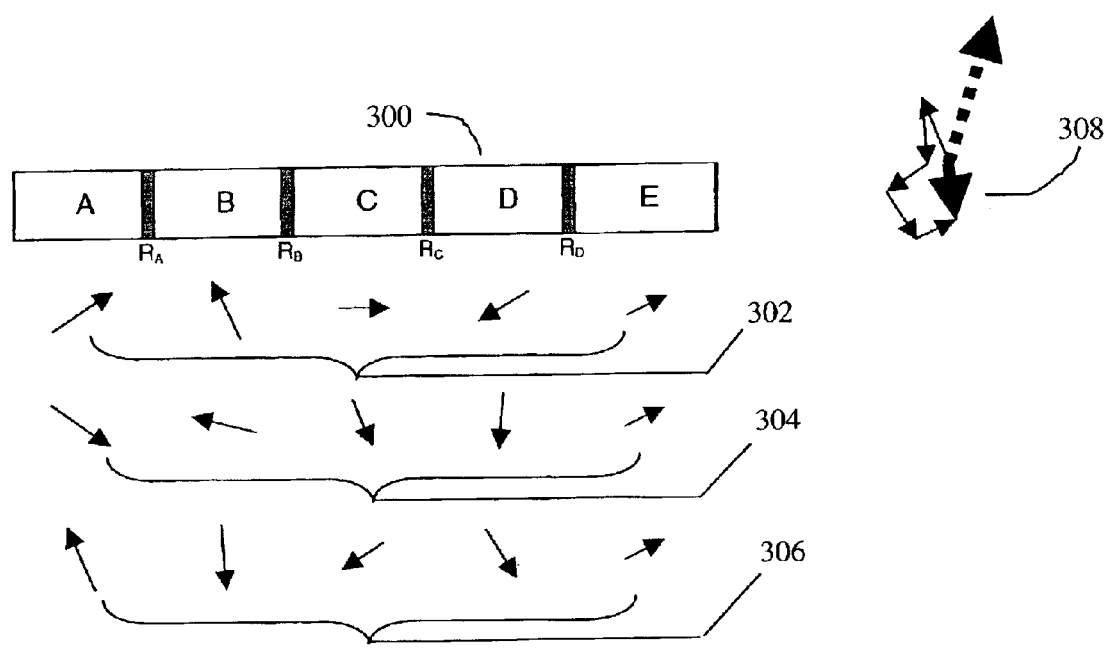
FIG. 3 is a schematic that conceptually depicts an optical medium segregated into a plurality of birefringent sections separated by polarization rotators under system control.

The optical receiver 406 may include hardware/software for measuring an error condition such as the total number of bit-errors counted in a received optical signal, and for correcting such errors by using, for example, forward error correction (FEC) techniques. For example, bit errors can be measured and corrected in accordance with the ITU G.709 standard, using a forward error correction (FEC) technique or according to any other known or later developed implementation capable of correcting bit-errors in a received optical signal. In accordance with an aspect of the invention, a plurality of polarization rotators is disposed between adjacent sections of an optical fiber and operates continuously to change the polarization state of the optical signal. This enables a continuous sample of the ensemble to be taken over time, thereby always reaching new fiber states that are represented by different elements of the statistical ensemble. By utilizing many polarization rotators that are spaced at approximately the correlation length of the fiber (the length of a section over which the birefringence is essentially uniform), the sampling will be close to ideal in the sense that at any instant of time any one of the ensemble members is accessible. Thus, over a long enough period of time, the entire distribution is sampled. With reference again to FIG. 3, if the individual segments represent sections of fiber that are less than or equal to a correlation length (i.e. the length over which the specific PMD is essentially constant), then locating polarization rotators in each section will essentially sample all the degrees of freedom over which the PMD can be expressed and the sampling will be complete. If, on the other hand, the sections in FIG. 3 are much longer than the correlation length, then the respective PMDs represented in each section are already partial sums as each section is already the concatenation of multiple independent subsections of fiber that are a correlation length long, and independent rotations of those subsections (with respect to each other) is not possible. The ensemble elements that are accessible by changing the states of the polarization rotators are those in which the intermediate concatenations of subsections, those comprising the sections, are already fixed. Only those ensemble elements with the given intermediate concatenations (but with independent joint sections) can be accessed by changing the states of the polarization rotators.

Figure 5:
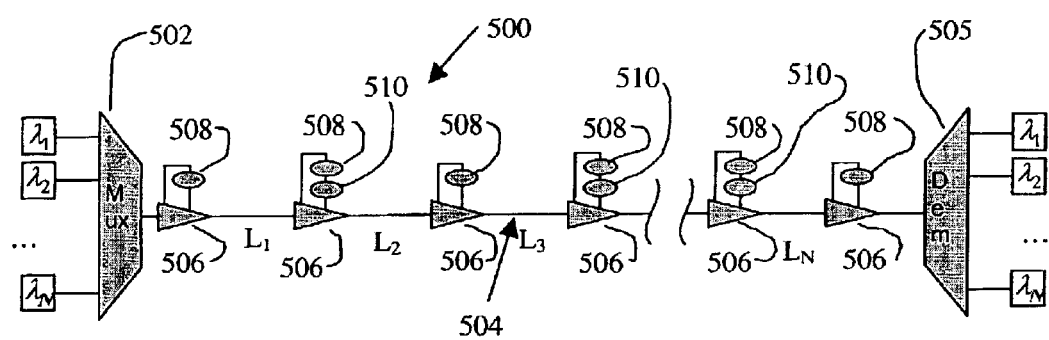
FIG. 5 is a schematic of an exemplary long-haul WDM system.

Referring now to FIG. 5, there is depicted an exemplary long-haul WDM system 500 in which a plurality of optical signals having respective wavelengths $\lambda_1, \lambda_2 \ldots \lambda_n$ are multiplexed via multiplexer 502 to an optical fiber 504 that has been segregated into a plurality of spans, i.e., fiber sections $L_1, L_2, L_3, \ldots L_N$. The multiplexed signals are demultiplexed at 505 as is well known in the art. The demultiplexer 505 may include hardware/software for measuring an error condition such as the total number of bit-errors counted in a received optical signal, and for correcting such errors by utilizing, for example, FEC. A plurality of optical amplifiers 506 are disposed at locations defining the terminating ends of each section L. Such amplifiers are generally placed to restore optical signal amplitudes before they have decayed to a level for which noise levels would corrupt the data. These amplifiers require power and are thus at locations in which other equipment (requiring electrical power) can be placed. A chromatic dispersion compensation module 508 is operably coupled to each amplifier 506 to compensate for the effects of chromatic dispersion in the fiber. In many systems today, such compensators are placed mid-span in a multi-stage optical amplifier. A polarization rotator 510 continuously rotates the optical signal's polarization state. The polarization rotator 510 can be an electro-optic polarization controller that utilizes an electrical drive signal of sufficiently high frequency. The polarization rotator 510 may comprise one or more optical polarization controllers such as, for example, a number of fiber squeezers, a combination of $\lambda/2$ and $\lambda/4$ optical delay components, or the like.

Figure 6:
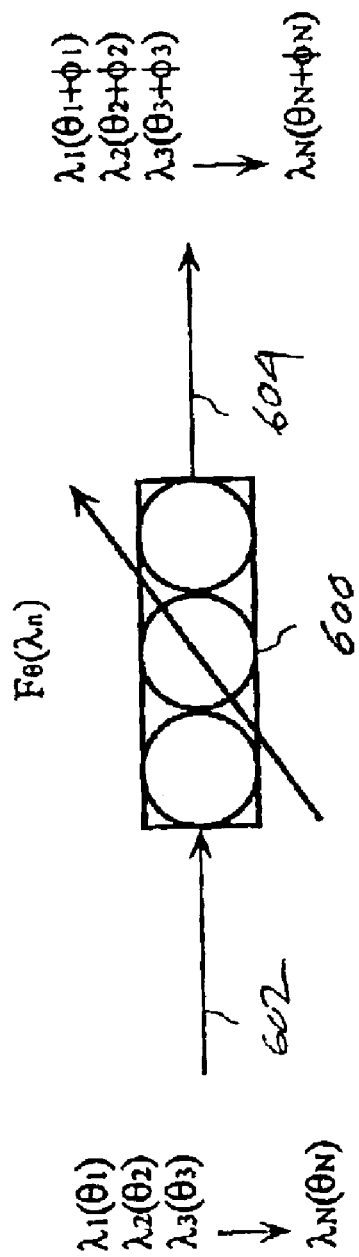
FIG. 6 is a schematic of an illustrative optical mitigation circuit in the form of a Lefevre polarization controller.

FIG. 6 depicts an illustrative polarization rotator 600 in the form of a Lefevre polarization controller that receives a plurality of optical signals with incoming wavelengths and polarizations $[\lambda_1(\theta_1), \lambda_2(\theta_2), \lambda_3(\theta_3) \ldots \lambda_n(\theta_n)]$ from a section 602 of the optical fiber, (where $\lambda$ represents the wavelength of each signal and $\theta$ is meant to represent its SOP, such as the polar and azimuthal angles in the Poincare sphere representation) and rotates the polarization state of the received signals to $[\lambda_1(\theta_1+\varnothing_1), \lambda_2(\theta_2+\varnothing_2), \lambda_3\theta_3+\varnothing_3) \ldots \lambda_n(\theta_n+\varnothing_n)]$, where $\varnothing$ represents the change in the signal's SOP, such as might be represented in a Poincare sphere representation. The polarization-rotated signals are then communicated to an adjacent section 604 of the optical fiber. Polarization rotation can be implemented with a single polarization rotator that can rotate the optical signal's SOP around a predetermined on a Poincare Sphere. Alternatively, a plurality of concatenated polarization rotators capable of rotating the polarization state around a plurality of fixed, orthogonal axes can be utilized. Euler's theorem states that these different physical views can both be viewed as a single rotation, so we will take this viewpoint.

Returning to our exemplary system of FIG. 5, if a large number of polarization rotators 510 are provided along the optical fiber and it is assumed that a certain amount of elapsed time $T_s$ is required to obtain a representative sample of the ensemble, over $T_s$, both good and bad ensemble elements (i.e. ensemble elements possessing low and high PMD) will be sampled in roughly the correct distribution, the distribution of the entire ensemble. Because the sample is representative, the expected number of errors in $T_s$ will be roughly equal to $B*T_s*P_n$, where $P_n$ is the "natural" outage probability that would be expected for the system at bit rate B. That is, the bit error rate will be approximately $P_n$, when observed over a time period $T_s$. Technically, each bit will see slightly different slates of the polarization as it travels from system input to output. However, practically speaking, there is a certain correlation time window of duration $T_c$, in which the bits will see approximately the same level of impairment. The errors in this window are essentially correlated because the bits in this window propagate through a single ensemble member. While it is conventional to refer to the state of the fiber at a moment in time as being determined by the polarization rotators, it is really the state of the fiber as experienced in the retarded time of a propagating pulse that is of importance. Naturally, this $T_c \ll T_s$, since for the period $T_c$, effectively one ensemble member is being sampled, and it takes many samples to fully characterize the distribution. Although performance may be degraded as errors occur at the natural outage rate, $P_n$, when averaged over a long enough time, forward error correction (FEC) techniques may be employed to correct these errors and thus improve the overall system performance.

FEC enables the detection and correction of errors that occur infrequently. A corrupted bit pattern can be restored to the pattern that was sent. As known by those skilled in the art, the basic concept is that a series of data bits can be sent as a block, along with additional coding bits. These augmented, coded, blocks have co-ordinates in an abstract space. A bit from the block is detected by the detector as "errored," when the resulting vector representing the errored block in the abstract space is not in the allowed set of vectors. Furthermore, the "distances," in the abstract space between the resulting vector and the allowed vectors are such that the intended vector can be determined unambiguously as being the closest vector to the received, errored, vector. In addition, the coding can be concatenated, with interleaving between stages, so that even if there were consecutive errors (i.e. a burst of errors) they can be "striped" over multiple code words, each of which would have only one error, for instance. Thus, interleaving increases FEC's effectiveness to correcting bursts of consecutive errors.

As a result of PMD, an optical system can drift into a "bad" state in which severe impairments might occur for a long period of time. The PMD dwell time for typical optical links in field-installed systems can be measured in hours to weeks. The processing required to implement the interleaving technique ultimately limits the length of an error burst that can be corrected, as this is much shorter than the potential PMD dwell time. In accordance with an aspect of the invention as shown in FIG. 5 and described above, the polarization rotators continuously rotate the SOPs of the optical signals. If the polarization rotators are driven at a fast enough rate, the system will dwell in a PMD errored state for a time shorter than the processing length of the FEC circuitry. That is, the number of bits that would potentially be errored due to PMD will be approximately $BT_c$ and this would be within the range of the FEC processing Accordingly, FEC can correct errors introduced by PMD as long as it can correct error bursts of approximately $BT_c$ bits in length.

The operation of this method is to be contrasted with the Eiselt approach. They are similar in that they each use a multiplicity of polarization rotators in the links of a long-haul system, and that they can beneficially use FEC. However, the Eiselt approach is essentially static with respect to the polarization rotators (i.e. it tries to leave the polarization rotators in a fixed condition) and uses the FEC circuitry's error rate reporting for each wavelength as an error signal in a feedback loop: when error rates on any one of the wavelengths reaches a pre-determined threshold, the polarization rotators are energized to provide a random set of rotations. The error rates are intended to stay at low levels for all wavelengths all the time. The current approach is complementary. It is active in the sense that the polarization rotators are driven continuously, without regard to any feedback signals at all. This is simpler, in the sense that no intelligence or processing is needed, and no evaluation of the FEC error rates is made to generate an error signal. On the other hand, instead of driving the system towards lower error rates, the present approach accepts that random driving of the rotators will at some times actually increase the system's uncorrected error rate. The parameters of the rotation speeds, etc., must be chosen for a given system.

Figure 1:
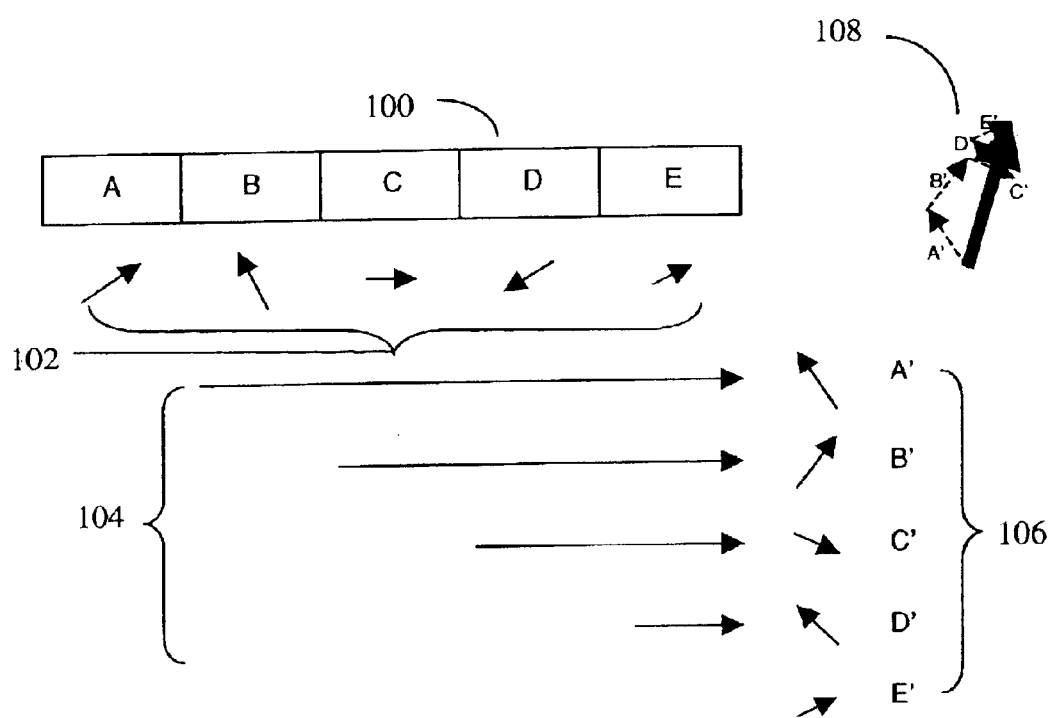
FIG. 1 is a schematic depicting PMD vectors representing a random distribution in magnitude and direction for the respective sections of an optical fiber.
Figure 2:
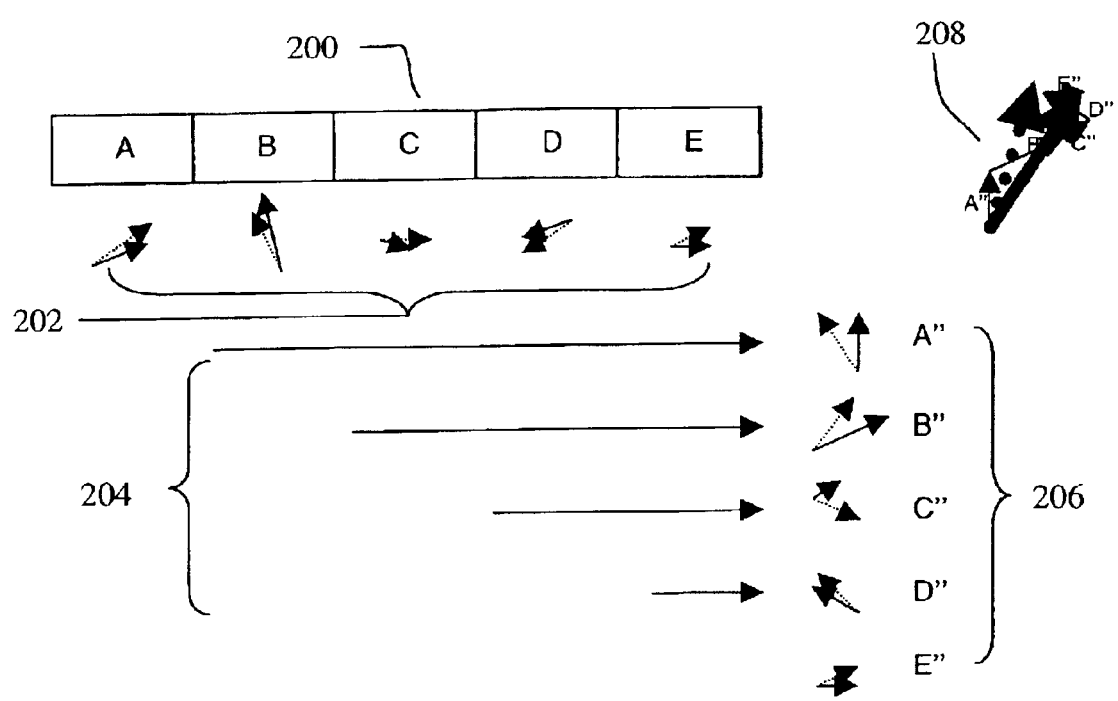
FIG. 2 is a schematic depicting the same fiber conducting an optical signal at a slightly different optical frequency, $\omega_0 + \Delta\omega$.

In the illustrative WDM system shown in FIG. 5, the rotation process illustrated in FIG. 3 and described above is implemented through polarization rotators at sites such as those illustrated in FIG. 5. As in FIG. 2, the same fiber looks different to different wavelengths as the light propagates. Similarly, as the polarization rotators illustrated schematically in FIGS. 3 and 5 are driven, the character of the fiber changes over time. Accordingly, the continuous rotation of the signal's polarization at a specified wavelength as shown in FIG. 3 occurs on all wavelengths as depicted in FIG. 5, although each signal wavelength will have consequently different vectors and birefringence rotations. Each wavelength channel may be experiencing high or low PMD at any given point in the bit stream, while other channels may be experiencing markedly different impairment levels over the same retarded period of time. Over long periods of time, however, each channel will sample the PMD distribution, each channel will experience error bursts as the polarization rotators place the bits in that dwell time through a highly impaired state, and each channel's FEC circuitry will correct these errors at different times. At other times, each wavelength will be in a low PMD, low error state. In the aggregate, though, each channel will have an approximate BER of $P_n$ that will be corrected by the FEC circuitry.

There is a tradeoff between the driving rate for the polarization controllers and the transmission system's clock recovery circuit that is mediated by the number of errored bits that the FEC circuit can process. As a rough estimate, we note that systems are typically specified to work at mean DGDs that are approximately ⅛ of a bit period. This means that the vast preponderance of time delay variations caused by variations in the DGD is encompassed in about ½ of a bit period, since the DGD has a Maxwellian distribution. As the polarization rotators are driven, all these variations in DGD will appear at the receiver to be variations in the pulse arrival times. The instantaneous clock phase will therefore vary as the polarization rotators sample the ensemble, imposing a different DGD (and thus arrival time) with each ensemble element. Over time interval $T_c$, the shortest time scale characterizing changes in PMD (and therefore DGD and arrival time) there will nominally be $BT_c$ bits, and this is also equal to or less than the FEC processing power. Over that same $T_c$ time period there will be as much as another ½ bit variation, due to the ½ period variation in DGD, so that now $T_c$, contains B $T_c+/-½$ bits. Thus, the fractional change in instantaneous frequency is approximately $BT_c$, or, put another way, if the FEC can correct for a burst of N bits, then B $T_c \leq N$, and the clock phase changes by ½N. Thus, if the FEC circuitry can correct for a burst of 1024 bits, for example, the clock phase will jitter by approximately 500 bit periods.

The present invention has been shown and described in what are considered to be the most practical and preferred embodiments. It is anticipated, however, that departures may be made therefrom and that obvious modifications will be implemented by those skilled in the art.

We claim:

1. A method of mitigating polarization mode dispersion (PMD) effects in an optical communications system, comprising the steps of:
   receiving at least one optical signal from a first section of an optical fiber;
   continually rotating the polarization state of the at least one optical signal to randomly change the polarization state of the at least one optical signal;
   propagating the at least one rotated optical signal through a second section of the optical fiber;
   receiving the at least one rotated optical signal;
   converting the at least one rotated optical signal into an electrical signal; and
   correcting any bit errors which may have been introduced.

2. The method recited in claim 1, further comprising the steps of:
   receiving the at least one rotated optical signal from the second section of the optical fiber;
   continually further rotating the polarization state of the at least one optical signal to randomly change the polarization state of the at least one optical signal; and
   propagating the at least one further rotated optical signal through a third section of the optical fiber.

3. The method recited in claim 2, wherein the rotation of the at least one optical signal received from the first section is performed at a distance from an optical source less than or equal to the correlation length of the optical fiber, and the rotation of the at least one optical signal received from the second section of the optical fiber is performed at a distance from the rotation of the at least one optical signal received from the first section less than or equal to the correlation length of the optical fiber.

4. The method recited in claim 1, wherein the step of correcting bit errors utilizes forward error correction.

5. A method of mitigating polarization mode dispersion (PMD) in an optical communications system, comprising the steps of:
   propagating at least one optical signal received from an optical source through a first section of an optical fiber;
   receiving the at least one optical signal from the first section of the optical fiber;
   continually rotating the polarization state of the at least one optical signal at a distance from an optical source less than or equal to the correlation length of the optical fiber;
   propagating the at least one rotated optical signal through a second section of the optical fiber over a distance less than or equal to the correlation length;
   receiving the at least one rotated optical signal from the second section of the optical fiber;
   continually further rotating the polarization state of the at least one optical signal; and
   propagating the at least one further rotated optical signal through a third section of the optical fiber.

6. The method recited in claim 5, further comprising the steps of:
   receiving the further rotated optical signal from the third section of the fiber, and
   applying forward error correction to the at least one further rotated optical signal.

7. A method of compensating for polarization mode dispersion (PMD) effects in an optical communications system, comprising the steps of:
   propagating a plurality of multiplexed optical signals received from an optical source through a first section of an optical fiber;
   receiving the plurality of optical signals from the first section of the optical fiber;
   continually rotating the polarization states of the plurality of optical signals to randomly change the polarization states of the optical signals at a distance from the optical source less than or equal to the correlation length of the optical fiber;
   propagating the rotated plurality of optical signals through a second section of the optical fiber over a distance less than or equal to the correlation length;
   receiving the rotated plurality of optical signals from the second section of the optical fiber;
   continually further rotating the respective polarization states of the plurality of
   optical signals to randomly change the polarization states of the optical signals;
   propagating the further rotated plurality of optical signals through a third section of the optical fiber;
   receiving the rotated optical signals;

converting the rotated optical signals into electrical signals; and correcting any bit errors which may have been introduced.

8. A method of mitigating polarization mode dispersion (PMD) effects in an optical communications system, comprising the steps of:

continually rotating the polarization states of a plurality of multiplexed optical signals to randomly change the polarization states of the optical signals between first and second adjacent sections of an optical fiber;

propagating the rotated plurality of optical signals through the second of the adjacent sections of the optical fiber;

receiving the rotated optical signals;

converting the rotated optical signals into electrical signals; and correcting any bit errors which may have been introduced.

9. An optical communications system that mitigates polarization mode dispersion (PMD) effects, comprising:

an optical fiber including a plurality of sections;

an optical compensator disposed between adjacent sections of the optical fiber for continuously rotating the polarization state of at least one optical signal received from a first of a pair of adjacent sections of the optical fiber signals to randomly change the polarization state of the at least one optical signal such that at least one rotated optical signal is communicated to a second of the pair of adjacent sections;

an optical receiver for receiving the at least one optical signal; and an error correction device for correcting any bit errors which may have been introduced.

10. The optical communications system recited in claim 9, wherein the sections of the optical fiber have a length that is less than or equal to a correlation length.

11. The optical communications system recited in claim 9, wherein the optical receiver applies forward error correction to the at least one received optical signal.

12. The optical communications system recited in claim 9, further comprising an optical source that transmits a plurality of multiplexed optical signals to the optical fiber.

13. An optical communications system that mitigates polarization mode dispersion (PMD) effects, comprising:

an optical source that transmits a plurality of multiplexed optical signals;

an optical fiber coupled to the optical source, the optical fiber including a plurality of sections;

an optical compensator disposed between adjacent sections of the optical fiber for continuously rotating the polarization state of at least one optical signal received from a first of a pair of adjacent sections of the optical fiber to randomly change the polarization state of the at least one optical signal such that at least one rotated optical signal is communicated to a second of the pair of adjacent sections;

an optical receiver for receiving the at least one optical signal; and an error correction device for correcting any bit errors which may have been introduced.

* * * * *